United States Patent [19]

Eschinasi

[11] 4,016,351
[45] Apr. 5, 1977

[54] PECTIC SUBSTANCES WITH VARYING METHOXYL CONTENT AND PROCESS THEREFOR

[76] Inventor: Emile H. Eschinasi, P.O. Box 7217, Haifa, Israel

[22] Filed: Feb. 4, 1976

[21] Appl. No.: 655,294

[52] U.S. Cl. .................................................. 536/2
[51] Int. Cl.² ........................................ C08B 37/06
[58] Field of Search ......................................... 536/2

[56] References Cited

UNITED STATES PATENTS

| | | | |
|---|---|---|---|
| 1,991,242 | 2/1935 | Cole et al. | 536/2 |
| 2,008,999 | 7/1935 | Wallerstein | 536/2 |
| 2,373,729 | 4/1945 | Willaman | 536/2 |
| 2,441,729 | 5/1948 | Steiner | 536/2 |
| 2,480,710 | 8/1949 | Bryant | 536/2 |
| 3,622,559 | 11/1971 | Wiles et al. | 536/2 |

*Primary Examiner*—Ronald W. Griffin
*Attorney, Agent, or Firm*—Lawrence Rosen; E. Janet Berry

[57] ABSTRACT

This invention is directed to a process for the production of pectic substances having a methoxyl content of about 2 about 12% from pectic bearing substances comprising combining naturally occurring pectin bearing substances and a source of calcium ions at a pH range of about 3 to 8 to temporarily immobilize and fix said pectic substances and to cause the release of superfluous sugar and soluble solids containing liquors and juices from said pectin bearing substances while achieving a simultaneous and controlled, IN SITU, demethoxylation of said pectins; and subsequently extracting and separating said pectic substances by adding an oxalic acid containing solution and removing said calcium ions as insoluble calcium oxalate salts.

15 Claims, No Drawings

PECTIC SUBSTANCES WITH VARYING METHOXYL CONTENT AND PROCESS THEREFOR

The invention relates to pectic substances in general having a methoxyl content ranging from 2–12% including, in particular, low methoxyl pectins, dubbed LMP, containing 2–5% methyl ester groups and more particularly to a process for the production of such pectic substances from readily available naturally occuring and inexpensive pectin bearing raw materials.

Pectic substances known in the art as pectic acids were described, in Chemical & Engineering News, Vol. 22, p. 105, Jan. 25, 1944, as polygalactouronic acids which contain more than negligible amounts of methyl ester groups.

As will be appreciated by those skilled in the art direct preparation of LMP from cheap pectin bearing raw materials offers substantial economic advantages over conventional processes for LMP and associated derivatives using costly and ready made commercial pectins (c.f. U.S. Pat. No. 2 480 710). Moreover, the process of this invention as described hereinafter requires minimal water usage and causes little or no environmental pollution in contradistinction to conventional citrus pectic extraction processes which are usually proceeded by lengthy and extensive water washings of the citrus peels etc., to remove tenaciously held solutions of soluble sugars and solids therefrom, which prior art processes usually result in the formation of large bodies of dilute and high BOD count effluents, usually discharged into the sewage systems and causing considerable environmental pollution.

Low methoxyl pectins prepared economically and directly according to this invention have a methoxyl content of 2–5% and, unlike the regular commercial pectins with 7–12% methyl ester groups, are capable of forming gels with milk, fruit and vegetable juices with or without sugar due to their ability to combine with calcium ions, or other comparable metallic ions, to form gels. They thus have the added versatility of being usable in the dietetic field and being capable of being incorporated in food with low or no sugar content. They are also capable of providing desirable higher viscosity to fruit and vegetable juices in the absence of sugar but in the presence of adequate amounts of calcium ions. Conversely, LMP are also capable of producing regular 65° Brix sugar jellies of very superior quality by proper adjustment of the pH of the medium.

A further feature of this invention is the high yeild of retrieval (over 80%) of pectic substances from the starting material in comparison with the lower retrieval (25–50%) obtained in conventional processes. Pectins obtained according to this invention additionally have desirable and satisfactory features including a jelly grade of 140–200 and an anhydrouronic acid content of 40–90% as determined by the carbazole test according to "Methods used at Western Regional Research Laboratories for Extraction and Analysis of Pectic Materials," June 1952, p. 9, by H. S. Own & Al. and published by the Bureau of Agricultural and Industrial Chemistry Research Administration, United States Department of Agriculture.

A novel and important feature of this invention is directed to a process for the preparation of pectic substances having a methoxyl content varying from 2–12% from pectin bearing raw materials, such as citrus peels, pomace etc., using calcium salts at pH range from 3–8 to achieve, IN SITU, a direct and controlled demethoxylation of the pectic substances into selected types of pectins including, in particular, the versatile and valuable LMP and a simultaneous but temporary, immobilization, or calcium fixation, of the pectic substances allowing the easy removal of superfluous peel juices from the starting material. Said peel juices, relatively rich (8°–11° Brix) in valuable soluble sugars and solids are also in an economically retrievable form. An additional feature of this invention is the subsequent and efficient extraction and separation of said fixed pectic substances using acidic solutions containing oxalic acid by itself or in combination with other mineral acids such as sulphuric, hydrochloric, nitric and phosphoric acid etc. The oxalic acid achieves the dual function of extracting pectin and trapping the freed calcium ions from the pectin extract as insoluble and readily removable salts.

Thus according to the present invention there is now provided a process for the production of pectic substances having a methoxyl content of about 2 about 12% from pectic bearing substances comprising combining naturally occurring pectin bearing substances and a source of calcium ions at a pH range of about 3 to 8 to temporarily immobilize and fix said pectic substances and to cause the release of superfluous sugar and soluble solids containing liquors and juices from said pectin bearing substances while achieving a simultaneous and controlled, IN SITU, demethoxylation of said pectins; and subsequently extracting and separating said pectic substances by adding an oxalic acid containing solution and removing said calcium ions as insoluble calcium oxalate salts.

In general terms it can be said that the process of the present invention involves three steps which could be classified in the following manner:

Step I: Pectin fixation and controlled demethoxylation with simultaneous removal of non-pectic juices from pectin containing raw materials (Citrus peels, pomace etc.);

Step II. Pectin extraction and calcium ion trapping and removal.

Step III. Pectin concentration, precipitation, isolation etc.

For the sake of illustration but not limiation of the process of this invention, fresh Jaffa Shamuti orange peels were selected for illustrative use in the following description of the invention. It is to be understood that any other pectin containing raw material in fresh or dried form such as, for example grapefruit and lemon peels or apple pomace etc., could be substituted without affecting the efficiency and merit of the process. The composition of the aforesaid fresh Jaffa Shamuti orange peels consisted of: 72–77% moisture, 7–8% sugars and soluble solids, 9–11% cellulosic material, etc., and 5–6% pectic substances mainly as firmly held protopectins in association with cellulosic material.

In step I, the ground, fresh orange peels (or adequate substitute) are treated with a solution, or mixture, containing sufficient amount of calcium ions in the form of neutral basic or acid salts such as calcium hydroxide, chloride nitrate, acetate, etc., to ensure the formation of insoluble calcium pectates and to cause the release and subsequent removal of superfluous non pectic juices and liquors (rich in sugars and easy to concentrate economically into citrus molasses thus avoiding environmental pollution) while achieving, at the same time, IN SITU, controlled and selective demethoxylation of the pectic substances through judicious adjustment of the pH between 3–8 at 15°–100°. Preferably said pectin fixation is carried out by adding about 1 to about 5 equivalents of calcium ions for every equivalent of pectin in the pectin bearing substance.

It is understood to those skilled in the art that a high pH between 7–8 will result in greater demethoxylation with the formation of LMP having 2–5% methoxyl content, whereas, a lower pH between 3–6 will bring only minor changes and will result in the formation of pectins with 7–12% methoxyl content. Temperatures and pH being interdependent, it is preferable to use a temperature in the range of about 15°–35° C at pH 7–8 and a temperature in the range of about 30–100° C at pH 3–6 to achieve adequate pectin fixation without undesirable breakdown of the polygalactouronic chain of said pectins.

In step II, the peel liquor-free press cake is treated with an acidic solution containing oxalic acid alone or in conjunction with other acids such as hydrochloric acid, phosphoric acid, sulphuric acid, etc., to free and extract the bulk of the pectins from the calcium pectates and the protopectins and, at the same time, to cause the precipitation and removal of the insoluble calcium oxalates by final adjustment of the pH between 4–7. The importance of the removal of the calcium ions from the final pectin extract will be appreciated by those skilled in the art since their presence, even in traces, is bound to interfere with the quality and final recovery of the pectins in general and LMP in particular. Although the volume of said solution used in the extraction process may vary between 1–10 volumes of the press cake, it is preferable to use, for economic and practical reasons, 4–6 volumes of 0.05–0.5 N acid solution containing a 1 to 5 fold excess of oxalic acid in relation to all calcium ions present in the mixture to be converted as insoluble calcium oxalate. It is especially preferable to work with acid solutions of 0.1–0.3 N and with an excess of oxalic acid of 50–150% between 15°–100°. Since, however, temperature and reaction time are interdependent it is preferable to work at 40°–80° for 30–90 minutes to complete the pectin extraction. In order to achieve a thorough removal of the calcium ions at this stage, it is also preferred to adjust the final pH of the medium between 3–7. It being understood that the closer to pH 7, the more the final pectins will be in the form of the corresponding salt used for the neutralisation (usually sodium, potassium or ammonium).

In step III, the pectic substances are separated from the clarified extract either by spray drying, to produce crude pectins showing an anhydrouronic acid content of 40–55%, or they are preferably concentrated and precipitated with water miscible solvents known in the art to provide the desirable pectins having an anhydrouronic acid content of 40–90%, a methoxyl content range between 2–12%, and a jelly grade of 140–200.

The following specific examples which include preferred embodiments will serve to illustrate the practice of this invention, it being understood that the invention is not limited to those specific examples, which are intended merely to illustrate preferred modes of practice of the process of the present invention.

EXAMPLE 1

1000 grams grapefruit peel and rag are combined with 1000 ml of milk of lime (made of 1000 ml. water or wash liquor from a previous batch) and containing enough $Ca(OH)_2$ to bring the pH of the mixture to about pH 7. (from about 4–10 gr. lime may be required according to the acidity of the peel and rag used). The mixture is matured for about 30 minutes at room temperature, then squeezed through a filter press releasing about 1500 ml of peel liquor of 7°–9° Brix (for eventual retrieval of the carbohydrates therein) and about 450 grams of peel cake which is then washed through the filter press with 1000 ml of fresh water yielding an equivalent amount of wash liquor (1°–2° Brix) reused for the liming of the next batch.

The washed cake (approx. 450 gr.) is treated with 3000 ml water containing 20 grams oxalic acid hydrate, or its equivalent of anhydrous acid, and heated between 60°–75° C under agitation for 30–40 minutes. Upon cooling to about 30° C enough caustic soda solution (ca. 5–10%) is added under vigorous agitation to neutralize the reaction mixture to about pH 6. The mixture is then filtered preferably through a continuous centrifuge separator affording 2800–3000 ml of an opalescent (1.5°–2° Br) pectin liquor which is clarified with an appropriate filter aid (Decalite, diatomaceous earth etc.) followed best by centrifugation to yield a clarified pectic sol which is preferably reduced to about 1/6th of its volume by evaporation under reduced pressure (20–60mm). To the resulting viscous opalescent pectin concentrate (approx. 500–600 ml) is added, under agitation, either a neutral water soluble alcohol (Methanol, ethanol, isopropanol etc.) or ketone (acetone, methyl ethyl ketone) in an amount equivalent in volume to that of the pectin liquor to obtain a neutral pectic gel or with an acidified alcohol or ketone to obtain a free acid pectin gel (the acidification being performed by pre-mixing the alcohol or ketone with 15–25 ml of HCl conc. or an adequate mineral acid such as $H_3PO_4$ etc.).

The desired gel is then filter pressed and washed with about 100 ml of 50% aqueous solvent to yield a pectin cake with about 30–70% aqueous solvent content which is dried at about 60° C under forced air or vacuum (20–60 mm) and ground to the desired mesh size.

The yield amounts to about 30–40 grams for the neutral pectin and about 26–35 grams for the free acid one.

The chemical and physical characteristics of the pectins so obtained are approximately as follows:

Neutral pectin

AUA (Anhydrouronic acid) content — = 70–75%
MeO (Methoxyl) content — = 3–5% corresponding to 24–40% Methyl esters.
Free carboxyls — = less than 5%

Acid Pectins

AUA — = 75–80%
MeO — = 3.5–5.5% corresponding to 26–45% esters
Free carboxyls — = 50–70%
Na Salt — = Less than 5%

EXAMPLE 2

1000 gr Orange peel and rag is treated as in example 1 with 1000 ml water or wash liquor from a previous batch but containing 6–15 grams of $CaCl_2$ (or an equivalent amount of lime and HCl) at 25°–45° C for 30–40 minutes allowing the reaction mixture to remain at pH 4.5–5.5 (The proper pH is adjusted by appropriate addition of HCl if necessary). After filter pressing and washing as in example 1., the resulting orange peel cake (ca. 450 gr) is treated with 3000 ml water containing 10 gr oxalic acid hydrate and 10 ml conc. HCl and agitated for 30–40 minutes at 60°–75° C. Upon cooling to about 30° C, the mixture is neutralized with a dilute ammonia solution (3–10%) under agitation to pH 5–6. The neutralized mixture is then centrifuged as in example 1, clarified and concentrated and precipitated accordingly to give either a neutral or an acid free pectin. The yield of dried and ground pectin is about 30–35 grams of neutral pectin or about 25–28 grams of the free acid one.

The chemical and physical characteristics of the pectins so obtained are approximately as follows:

Neutral Pectin

AUA content — = 75–82%
MeO content — = 8.5–10.5, corresponding to 70–87% Methyl esters
Free carboxyls — = less than 5%
jelly grade — = 160–180 (Ridgelmeter sag test)

Acid free Pectin

AUA content — = 75–82%
MeO content — = 9–12%, corresponding to 74–90% Methyl esters
Free carboxyls — = 10–24%
$NH_4$ salts — = less than 3%
Jelly grade — = 170–200

EXAMPLE 3

1000 gr mixed citrus peel and rag (Grapefruit, orange and lemon) are treated as in example 2 with $CaCl_2$. The pectin extraction is then performed with 3000 ml water containing 5 gr oxalic acid hydrate and 15 gr 85% $H_3PO_4$ under the condition of example 2. The neutralization is then carried out with dilute NaOH to pH 5 and the resulting pectins recovered according to example 2 thus affording approximately 35–40 gr neutral pectin or 29–34 grams of free acid pectin.

The chemical and physical characteristics of the pectins so obtained are approximately as follows:

Neutral Pectin

AUA content — = 72–80%
MeO content — = 8.0–9.5, corresponding to 65–79% Methyl esters
Free carboxyls — = less than 5%
Jelly grade — = 150–170

Acid Free Pectin

AUA content — = 75–82%
MeO content — = 9–11%
Jelly grade — = 160–180

EXAMPLE 4

1000 gr Apple pomace is treated with 1000 ml water and lime as in example 1 to pH 7 and treated accordingly for the removal of the peel juice. The washed and filter pressed cake (ca. 500 gr) is treated with 3000 ml water and 25 grams of oxalic acid hydrate for 45 minutes at 70°–95° C. The cooled mixture (30° C) is then neutralized under agitation with 10% aqueous ammonia solution to pH 6–7 and after filtration and clarification as in example 1, the concentrated neutral pectin sol is precipitated as in Example 1 yielding 35–40 grams of neutral pectin or 30–35 free acid pectin.

The chemical and physical characteristics of the pectins so obtained are approximately as follows:

Neutral Pectin:

AUA content — = 70–75%
MeO content — = 2.5–4% corresponding to 20–33% Methyl esters
Free carboxyles — = less than 5%

Acid Free Pectin

AUA content — = 74–80%
MeO content — = 2.8–5%, corresponding to 23–35% Methyl esters
Free carboxyls — = 60–70%
Ammonium salts — = less than 2%

In order that the present invention in its broader aspects may be understood more fully there is now provided a more general discription of alternative processes and procedures according to the present invention and general considerations governing the same:

GENERAL EXAMPLE 5

200 kg of freshly ground Jaffa Shamuti orange peels (or any adequate substitute as mentioned before) are treated in a suitable pug mill with 100 kg aqueous solution (preferably obtained from the press cake wash of a previous batch as described below) and containing sufficient amounts of soluble milk of lime ($Ca(OH)_2$) and/or, soluble calcium salts, preferably $CaCl_2$, to provide a total of 0.5–4 kg, but preferably 1.5–2 kg calcium ions and kept within a selected range of pH between 3–8 and a temperature between 15°–100°, but preferably 15°–45° for a sufficient length of time to achieve the desired demethoxylation of the pectic substances therein. When working at pH 6–7, for example, I prefer to proceed at 20°–30° for 20–30 minutes to achieve a methoxyl range of 2–5%, whereas at pH 4–6 I prefer to work around 30°–50° for 40–60 minutes to obtain a methoxyl content of 7–12%. The reaction mixture is then passed through a pulp press where 200–220 kg of press liquor (8°–11° Brix) is squeezed off (and used for retrieval of the carbohydrates throgh concentration into valuable citrus molasses). The press cake is then flushed with 100 kg of 20°–40° fresh water and the resulting wash liquor (100 kg 3°–5° Brix) recycled into a subsequent batch after addition of the proper amount of calcium salts. The resulting, substantially sugar free, press cake (90–100 kg) is treated in an extraction tank with 400–1000 kg of a 0.05 to 0.5 N acid solution containing from 1–5 kg oxalic acid and from 0–5 moles of hydrochloric acid or an equivalent amount of phosphoric, sulphuric or nitric acid although I prefer to use, for practical and economic reasons, a mixture of oxalic and hydrochloric acids as stated before. I also prefer to heat the reaction mixture at 30°–100° for 30–90 minutes to achieve a thorough extraction of the pectic substances with a minimum amount of degradation of their polygalactouronic acid chain. It being understood that reacting temperature and time are interelated and could both be varied within wide range. Also, the relation between oxalic acid and the mineral acids are related to the amount of pectic substances and calcium ions present. However, from practical and economical reasons, the abovementioned limits have proven satisfactory for the purpose of obtaining high yields of said pectins. For best conditions of precipitation and removal of the insoluble calcium oxalates the pH of the final pectin extract is adjusted at pH 3–7, preferably, with a solution of soda ash or caustic soda (although equivalent amounts of ammonium or potassium bases could be used). The choice of the proper pH is dependent on the nature and the methoxyl content of final pectinic extract sought. For example, a pH 6–7 is preferred for LMP, whereas pH 3–5 would suit a product with higher methoxyl content. Also, it would be obvious to those skilled in the art that the extent of neutralization in the last stage of extraction of the said pectins will result in a final product being partly or totally converted into corresponding sodium, potassium or ammonium polygalacturonate. The pectin extract is finally separated from the depectinized pulp, clarified, concentrated and precipitated with 0.5 to 3 volumes of water miscible neutral or acidified solvents such as acetone or alcohols of low molecular weight ($C_1$–$C_5$) as known in the art or, the aforesaid clarified pectin extract is spray dried to provide a crude pectin showing a 40–55% anhydrouronic acid content. I prefer, however, the precipitated pectin which provides 8–9 kg of a product having 60–90% anhydrouronic acid content by titration.

The preferred pectinic substances obtained according to my invention show upon analysis the following results:

| | |
|---|---|
| Anhydrouronic acid (Carbazole test) | 40–90 % |
| Methoxyl content, regular pectins | 7–12 % |
| Methoxyl content, LMP, low methoxyl pectins | 2–5 % |
| Moisture | 4–8 % |
| Ash (mostly Na Salt) | 1–2 % |
| Other polymeric carbohydrates | 5–10 % |
| Jelly grade (Sag test) | 140–200 % |

The crude spray dried pectins varied in content and showed a 40–55% anhydrouronic acid value (carbazole test), a higher percentage of carbohydrates (15–25%, an ash content of 2–4% and a jelly grade between 100–140.

The foregoing describes and illustrates the practice of my invention in full and clear way which, however, is not to be limited thereby, but is to be construed as broadly as permissible in view of the prior art and limited solely by the appended claims.

What is claimed is:

1. A process for the production of pectic substances having a methoxyl content of about 2 to about 12% from pectin bearing substances comprising combining naturally occurring pectin bearing substances and a source of calcium ions at a pH range of about 3 to 8 to temporarily immobilize and fix said pectic substances and to cause the release of superfluous sugar and soluble solids containing liquors and juices from said pectin bearing substances while achieving a simultaneous and controlled, IN SITU, demethoxylation of said pectins; and subsequently extracting and separating said pectic substances by adding an oxalic acid containing solution and removing said calcium ions as insoluble calcium oxalate salts.

2. A process according to claim 1 wherein said pectin bearing substances are of fruit origin.

3. A process according to claim 2 wherein said pectin bearing substances are selected from citrus fruit peels and pomace.

4. A process according to claim 1 wherein the source of said calcium ions is selected from the group consisting of neutral, basic and acid salts of calcium.

5. A process according to claim 1 wherein said source of calcium is $Ca(OH)_2$.

6. A process according to claim 1 wherein the pectin fixation is carried out by adding about 1 to about 5 equivalents of calcium ions for every equivalent of pectin in the pectin bearing substance.

7. A process according to claim 1 wherein said extraction and separation is carried out by adding about 1 to about 10 volumes of a 0.05 to 0.5 N acid solution comprising oxalic acid.

8. A process according to claim 7 wherein said solution also comprises a mineral acid selected from the group consisting of hydrochloric, phosphoric, nitric and sulphuric acid.

9. A process according to claim 7 wherein said extraction and separation is carried out by adding about 1 to about 5 equivalents of oxalic acid for every equivalent of calcium ions originally added.

10. A process according to claim 1 carried out at a temperature range of about 15° to about 100° C.

11. A process according to claim 1 wherein the pH of the pectin extract is adjusted to a range of about 3 to about 7 for the percipitation and removal of the insoluble calcium oxalate salts.

12. A process according to claim 1 wherein the pectin extract is finally separated, clarified, concentrated and percipitated with about 0.5 to about 3 volumes of a water miscible solvent.

13. A process according to claim 1 wherein the pectin extract is finally separated, clarified and spray dried.

14. A process according to claim 1 wherein the pectin fixation is carried out with $Ca(OH)_2$ at pH 6–7 at 20°–40°, and the pectin extraction with a mixture of hydrochloric and oxalic acid in concentration 0.05 to 0.5 N at 20°–100° to produce a low methoxyl pectin LMP showing an anhydrouronic acid content of 60–70%; a methoxyl content of 2–5% and having a jelly grade of about 140 to about 160.

15. A process according to claim 1 wherein the pectin fixation is carried out at pH 4–5 using a calcium ion source selected from the group consisting of calcium chloride, milk of lime or a mixture thereof at 20°–80° C and the pectin extraction is carried out in the presence of 1–4 mol equivalent of oxalic acid in a 0.05–0.5 N solution at 30°–100° C to produce a pectin showing an anhydrouronic acid content of 40–90%, a methoxyl content of 7–12% and a jelly grade of about 160 to about 200.

* * * * *